Jan. 25, 1949.                  C. C. HOAGE                  2,459,819
                             WEEDLESS FISH LURE
                             Filed May 2, 1946
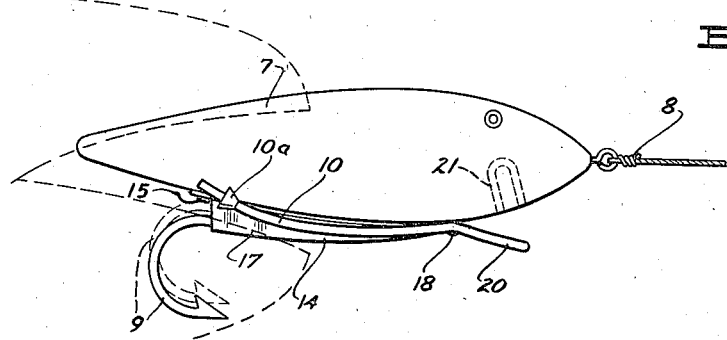
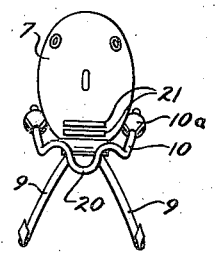
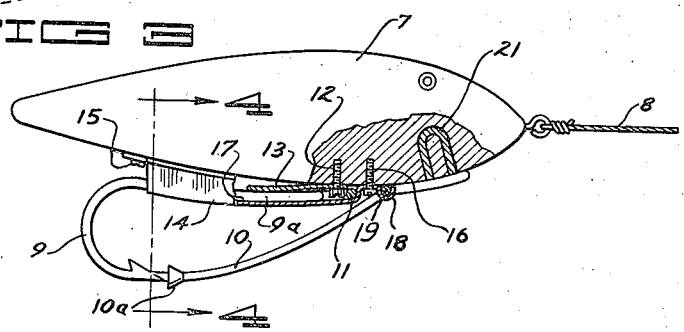
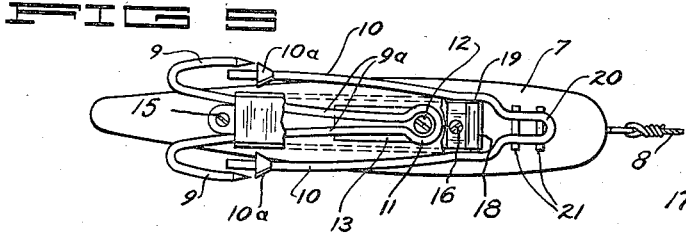
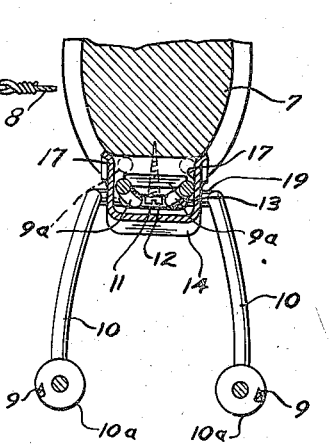
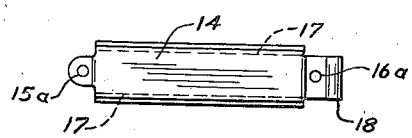
INVENTOR.
CLYDE C. HOAGE
BY *John E. Stryker*
ATTORNEY Patented Jan. 25, 1949

2,459,819

UNITED STATES PATENT OFFICE 2,459,819

WEEDLESS FISH LURE

Clyde C. Hoage, St. Paul, Minn.

Application May 2, 1946, Serial No. 666,647

8 Claims. (Cl. 43—39)

This invention relates to a fish lure of the "weedless" type having one or more hooks and guard members normally projecting in position to guard against the snagging or entanglement of the lure generally and the hooks in particular in weeds or other obstructions that may be encountered in use.

It is an object of my invention to provide, in a device of this class, novel and efficient means for biasing a hook guard toward guarding position and causing instantaneous and ample spacing of the guard from the hook when the lure is struck by a fish.

A particular object is to provide magnetic means for biasing a novel hook guard to guarding position with adequate force to insure against snagging, in combination with means whereby slight separation of the guard from the hook causes free movement of the guard to completely clear the hook.

A further and particular object is to improve the efficiency of a lure of the class described by providing a guard arm which normally projects adjacent to a hook which is spring biased to a predetermined position from which it may be retracted together with the guard when struck by a fish, in combination with a magnet carried by the lure and arranged to retain the arm in guarding position until the hook and arm together are moved against the spring bias and to completely clear the hook when a fish strikes the guard arm.

Other objects will appear and be more fully pointed out in the following specification and claims.

In the accompanying drawing I have illustrated, by way of example and not for the purpose of limitation, a preferred form of my lure.

Referring to the drawing:

Figure 1 is a side elevational view of my improved lure with the guard in retracted position as when struck by a fish, a portion of a fish's head being indicated in broken lines;

Fig. 2 is a front end view of the same;

Fig. 3 is a part side elevational view and part central vertical sectional view of the lure, showing the guard in hook guarding position;

Fig. 4 is a fragmentary cross section taken on the line 4—4 of Fig. 3 and enlarged;

Fig. 5 is a bottom plan view of the lure with the attaching plate removed, and

Fig. 6 is a bottom plan view of the attaching plate.

In the drawing, the numeral 7 indicates the body of the lure which is constructed from any suitable material and provided at its normally front end with suitable means for attaching a fish line leader 8. Mounted on the normally lower side or bottom of the body 7 is a pair of fish hooks 9 and a pair of guard arms 10. The hooks 9 project down from the rear portion of the body 7 and are joined together by shank portions 9a formed with an eye 11 to receive a screw 12 for attaching them to the body 7. Between the hooks and body and held in place by the screw 12 is a small leaf spring 13 arranged to urge the hooks downward within an attaching plate 14. The screw 12 fits loosely in the eye 11 so that limited movement of the hooks 9 to and from the body 7 is permitted. The plate 14 is fastened to the body 7 by small screws 15 and 16 passing through apertures 15a and 16a in the plate (Fig. 6). Upwardly projecting flanges 17 extend along the side edges of the plate 14 and the shank portions 9a pass out at the rear ends of these flanges through suitable openings which permit limited vertical oscillating movement of the hooks 9 relative to the body 7, as indicated in broken lines in Figs. 1 and 4. It will be evident that the plate 14 with its flanges 17 form a receptacle for the shank portions of the hooks 9 as well as the spring 13 and screw 12.

The front end portion of the plate 14 is formed with a bead 18 which embraces a pivot pin 19 connecting the guard arms 10 together. Formed in continuation of the arms 10 to the front of the pin 19 is a U-shaped arm 20 adapted to move to and from the poles of a permanent magnet 21. This magnet is shown embedded in the body 7 and has its poles extending to the bottom surface of the body adjacent to the lever arm 20 which is constructed from magnetically attractable material, such as stainless steel or other suitable metal or alloy. When the arms 10 are in their hook guarding position shown in Figs. 3, 4 and 5, the arm 20 is substantially in contact with the poles of the magnet 21 and is held by the magnetic attraction with sufficient force to cause the arms 10 to perform their guarding function efficiently. As further indicated in Figs. 3 and 5, the rear ends of the arms 10 are disposed closely adjacent to the barbed points of the hooks 9 and the hook points are guarded by cone shaped collar members 10a which are fixed on the arms 10 to project directly in front of the hook points when the arms 10 are in their guarding position. The bead 18 constitutes a lever fulcrum bearing allowing oscillating movement of the lever arms 10 and 20 from the hook guarding or closed position (Fig. 3) to the open position shown in Figs. 1 and 2.

My improved lure is drawn through the water in the usual manner and may be used among weeds or other obstructions without danger of snagging or entanglement since all parts are smoothly rounded or otherwise shaped to slide off of obstructions when the arms 10 are in guard position where they are normally held by magnetic attraction of the magnet 21 for the lever arm 20. When a fish strikes either or both of the arms 10 with sufficient force to overcome the magnetic attraction of the magnet 21, the arms 10 are moved upward instantaneously to a position such as that indicated in full lines in Fig. 1, thus completely freeing the hook. When a fish is caught, the guard arms remain in retracted position and do not interfere with the removal of the hook from the fish. Slight separation of the arm 20 from the poles of the magnet 21 is sufficient to substantially destroy the magnetic attraction and thus permit free movement of the arms 10 to completely retracted position. In case a fish takes the lure in such a manner as to compress both a hook 9 and a guard arm 10 upward, in that event, the hooks 9 are moved upward relative to the body 7, against the action of the spring 11, to a position such as that indicated in broken lines in Fig. 1 and the lever arm 20 is thereby separated from the magnet 21 sufficiently to permit unobstructed further movement of the arms 10 upward. As a result, there is an instantaneous and complete elimination of all obstruction which would otherwise prevent the hooks from performing their function. Because of their greater weight the relatively long lever arms 10 return by gravity toward their guarding position until the shorter arm 20 enters the magnetic field of the magnet 21 and is drawn up against the body and poles of the magnet, thereby retaining the arms 10 securely in their guarding position. This operation is entirely automatic, requiring no attention or resetting by the fisherman.

My improved lure is simple and inexpensive to manufacture and all parts are so constructed as to efficiently avoid snagging when drawn through water containing weeds and other obstructions.

Having described my invention, what I claim as new and desire to protect by Letters Patent is:

1. In a fish lure, a body, a hook projecting from said body, a guard for said hook carried by said body and movable to and from guarding position, and magnetic means carried by said body and operative to bias said guard toward hook guarding position.

2. In combination with a fish lure body, a hook carried by said body, a guard arm pivotally connected to said body and movable to and from a guard position with respect to the hook, and a magnet carried by said body in position to attract said arm to hook guarding position.

3. In a fish lure, a body, a pair of hooks projecting from said body, guards for said hooks, respectively, carried by said body and movable to and from hook guarding position, and a permanent magnet carried by said body and operative to bias said guards toward hook guarding position.

4. In combination with a fish lure body, a hook carried by said body, a lever pivotally connected to said body and having an arm movable to and from a guarding position with respect to the hook, and a magnet carried by said body, said lever also having a relatively short lever arm subject to the magnetic attraction of said magnet and operative to normally retain said first mentioned arm in hook guarding position.

5. In combination with a fish lure body, a hook projecting downward from said body, a lever pivotally connected to said body and having an arm projecting obliquely downward to the point of the hook and movable to and from a guarding position with respect to the hook, and a magnet carried by the front end portion of said body, said lever also having a relatively short lever arm subject to the magnetic attraction of said magnet and operative to normally retain said first mentioned arm in hook guarding position.

6. In combination with a lure body, a hook, a guard arm normally projecting adjacent to said hook and movable to a retracted position in spaced relation thereto, means connecting said hook to said body and permitting limited movement of the hook to and from the body, spring means normally extending the hook relative to the body, and magnetic means carried by said body and disposed to attract said arm to hook guarding position.

7. In combination with a lure body, a hook, a lever arm pivotally connected to said body, normally projecting in a guarding position adjacent to said hook and movable to a retracted position in spaced relation thereto, means connecting said hook to said body and permitting limited movement of the hook relative to the body, spring means normally extending the hook relative to the body, a second lever arm integral with said first mentioned arm, and magnetic means carried by said body and disposed to attract said second lever arm and to normally retain said first mentioned arm in hook guarding position.

8. In combination with a lure body, a pair of hooks, a pair of arms pivotally connected to said body, normally projecting in a guarding position adjacent to said hooks and movable to a retracted position in spaced relation thereto, means connecting said hooks to said body and permitting limited movement of the hooks relative to the body, spring means normally extending the hooks relative to the body, a second lever arm integral with said first mentioned arms, and magnetic means carried by said body and disposed to attract said second lever arm and to normally retain said first mentioned arms in hook guarding position, said first mentioned arms being disposed to be moved from fully retracted position by gravity toward hook guarding position.

CLYDE C. HOAGE.

REFERENCES CITED

The following references are of record in the file of this patent:

UNITED STATES PATENTS

| Number | Name | Date |
| --- | --- | --- |
| 726,020 | Bryan | Apr. 21, 1903 |
| 1,597,551 | Stewart | Aug. 24, 1926 |

FOREIGN PATENTS

| Number | Country | Date |
| --- | --- | --- |
| 736,437 | France | Aug. 24, 1926 |